United States Patent
Ju et al.

(10) Patent No.: US 7,567,486 B2
(45) Date of Patent: Jul. 28, 2009

(54) SLIM TYPE OPTICAL PICK-UP ACTUATOR

(75) Inventors: Chae Min Ju, Hwaseong-si (KR); In Ho Choi, Seongnam-si (KR)

(73) Assignee: LG Electronics Inc., Seoul (KR)

(*) Notice: Subject to any disclaimer, the term of this patent is extended or adjusted under 35 U.S.C. 154(b) by 758 days.

(21) Appl. No.: 10/984,897

(22) Filed: Nov. 10, 2004

(65) Prior Publication Data
US 2005/0141359 A1 Jun. 30, 2005

(30) Foreign Application Priority Data
Dec. 24, 2003 (KR) .................. 10-2003-0096643

(51) Int. Cl.
*G11B 7/09* (2006.01)
(52) U.S. Cl. .................. 369/44.15; 369/44.22; 720/683
(58) Field of Classification Search .................. None
See application file for complete search history.

(56) References Cited

U.S. PATENT DOCUMENTS

| | | | |
|---|---|---|---|
| 6,278,669 B1* | 8/2001 | Anzai et al. | 369/44.14 |
| 6,362,927 B1* | 3/2002 | Hori | 359/813 |
| 7,193,937 B2* | 3/2007 | Ikawa et al. | 369/44.15 |
| 7,194,749 B2* | 3/2007 | Hatazawa | 720/683 |
| 7,199,949 B2* | 4/2007 | Haruguchi et al. | 359/814 |
| 7,272,840 B2* | 9/2007 | Cheong et al. | 720/683 |
| 2005/0141358 A1* | 6/2005 | Kim | 369/44.15 |

FOREIGN PATENT DOCUMENTS

| | | | |
|---|---|---|---|
| JP | 2003-141756 A | | 5/2003 |
| JP | 2003-141760 | | 5/2003 |
| JP | 2003-173556 A | | 6/2003 |

* cited by examiner

*Primary Examiner*—Michael V Battaglia
(74) *Attorney, Agent, or Firm*—Birch, Stewart, Kolasch & Birch, LLP

(57) ABSTRACT

A slim type optical pick-up actuator is provided. The actuator including: a lens holder provided with an object lens mounted at a predetermined portion thereof, two or more focusing coils received in a receiving groove thereof, a tracking coil disposed on a front surface of the focusing coils, and a tilt coil disposed on a top of the focusing coils, and moving in 3-axis directions; a bipolar magnet disposed facing the coils; two or more unipolar magnets facing the bipolar magnet and having an opposite polarity to the bipolar magnet; a yoke plate having a bent inner yoke, the inner yoke having inner surfaces facing each other, on which the bipolar magnet and the two or more unipolar magnets are respectively attached; and a wire suspension supporting moving of the lens holder and electrically connected to the coils.

26 Claims, 11 Drawing Sheets

SLIM TYPE OPTICAL PICK-UP ACTUATOR

BACKGROUND OF THE INVENTION

1. Field of the Invention

The present invention relates to an optical pick-up actuator, and more particularly, to a slim type optical pick-up actuator that has a magnetic circuit in a lens holder thereof.

2. Description of the Related Art

Generally, in a device for reading and writing information using an optical disk, an optical pick-up actuator functions to allow laser beam transmitted through an object lens to be accurately located on a track formed on a surface of the disk. With the storage capacity of the optical disk being increased, it is increasingly required to provide a more precision driving control.

In order to provide the more precision driving control, the number of apertures of the object lens is increased. However, the increase of the number of apertures inevitably generates the aberration due to the tilt of the disk. The tilt of the disk deteriorates the playback function and makes it difficult to form fit in the course of writing and information.

Therefore, there is a need for a tilt motion device for correcting the tilt of the disk while performing the tracking motion. There are two typical methods for correcting the tilt: a method for correcting the tilt by moving an overall body of an actuator using a DC motor and a method for correcting the tilt by moving only an optical pick-up motion part (a lens holder) of the actuator.

The former has a problem that it corrects only a disk in a low frequency band and increases an overall size of the optical disk player.

In order to perform the latter, two types of optical pick-up actuators, a moving coil type and a moving magnet type, have been proposed.

However, the moving coil type has at least six wires connected to a driving side to control the tilt motion, complicating the structure. The moving magnet type has a disadvantage of making it difficult to obtain enough sensitivity required for the object lens of the lens holder.

FIGS. 1 through 4 show a 3-axis motion type optical pick-up actuator of related art.

As shown in the drawings, the optical pick-up actuator of related art comprises an object lens 11 for focusing laser beam from an optical disk, tracking and focusing coils 12 and 13 installed on a rear side of the object lens 11, a lens holder 10 provided at a rear surface with tilt magnets 15, and front and rear yokes 22 for fixing magnets for realizing tracking and focusing motions of the tracking and focusing coils 12 and 13.

The optical pick-up actuator further comprises a yoke plate 20 spaced away from the front and rear yokes 22 and provided with a tilt yoke 23, a plurality of wire suspensions 30 disposed on both sides of the lens holder 10 and electrically connected to the tracking and focusing coils 12 and 13, fixing parts 41 for holding the wire suspensions 30 extending therethrough, a yoke insertion member 42 for receiving the tilt yoke 23 disposed between the fixing parts 41, a yoke insertion member 42 disposed between the fixing parts 41 for receiving the tilt yoke 23, a frame 40 provided at a rear surface with a board 43 for electrically connecting the wire suspensions 30 to each other, and a tilt coil 50 disposed around the yoke insertion member 42 to generate electromagnetic force around the tilt magnets 15.

The tilt magnets 15 are disposed having a polarity opposite to each other, opposing the tilt coil and the lens holder 10.

The lens holder 10 is provided at a rear surface with fitting grooves 16 for receiving the tilt magnets 15. The fitting grooves 16 are formed on left and right sides based on a central line of the lens holder 10 on which the object lens 11 is installed.

Instead of forming the fitting grooves 16, adhesive may be used to attach the tilt magnets 15 on the rear surface of the lens holder 10.

Alternatively, the tilt magnets 15 may be further provided on a front surface of the lens holder 10. In this case, plural tilt magnets 15 correspond to a single coil 50 in a state where the tilt yoke 23 is formed on a yoke plate 20.

The operation of the above described optical pick-up actuator of the related art will be described hereinafter.

The focusing and tracking motions of the optical pick-up actuator are realized by electromagnetic force generated by the magnet 21 attached on the yoke 22 and the focusing and tracking coils 13 and 12 of the lens holder 10, thereby reading and writing data.

The tilt motion of the actuator for eliminating the tilt aberration caused by the high RPM of the optical disk is realized by electromagnetic force generated by the tilt magnets 15 installed on the lens holder 10 and the tilt coils 50 installed on the tilt yoke 23 to tilt the lens holder 10.

That is, the tilt magnets 15 installed on the left and right sides of the lens holder 10 holding the object lens 11 are, as shown in FIG. 4, disposed having an polarity opposite to each other to perform the tilt motion using electromagnetic force generated by the tilt coil 50 disposed facing the tilt magnets 15.

In FIG. 4, the reference characters B, i and F indicates electromagnetic field, current, and Lorentz force. The Lorentz force is generated by interaction of the electromagnetic field B and the current i. The arrows beside the characters in the drawing indicate directions of the electromagnetic field, the current, and the Lorentz force.

That is, since the current i flows in a predetermined direction and the tilt magnets 15 have an opposite polarity to each other, a couple is applied to the lens holder 10 on which the object lens 11 is installed. Since the couple corresponds to moment applied in a direction of an X-axis, the lens holder tilts in a seesaw motion about the X-axis.

As the tilt magnets 15 and the tilt coil 50 are disposed spacing away form the focusing and tracking coils 13 and 12, such a tilt motion can be realized independent form the focusing and tracking motions.

By maintaining a predetermined air gap dx between the tilt magnets 15 and the tilt coil 50, magnetic flux between the tilt magnets 15 and the coil 50 is not varied in the course of performing the tracking motion.

Therefore, when compared with a hybrid-type optical pick-up actuator of related art, the 3-axis motion type optical pick-up actuator of related art has advantage of increasing an output constant in a direction of the tilting motion because the air gap dx between the tilt magnets 15 and the tilt coil 50 is set to have minimal distance when the tilt motion is realized, not affecting the tracking and focusing motions in a state where the electromagnetic force is generated by the tilt magnets 15 and the tilt coil 50.

As described above, the above-described 3-axis motion type optical pick-up actuator performs the 3-axis motion (focusing, tracking, and tilting motions) by providing the plural tilt-magnets 15 formed on the lens holder 10 and the tilt coil 50 independently installed in the yoke insertion member 42 between the fixing parts 41 of the frame 40.

However, the tilt magnets 15 separately installed on a rear surface of the lens holder 10 cause a size and weight of the lens holder to be increased, deteriorating the productivity and sensitivity.

Also, additional insertion and supporting structures for a magnetic circuit performing a radial tilt must be provided.

Further, since each of the wire suspensions is comprised of four numbers of wire springs and two number of coil springs to perform the 3-axis motion, complicating the structure and deteriorating the productivity.

Further, since an axis of the radial tilt is located on a rear side of the lens, an offset in a direction of a Z-axis is incurred.

Further, the two magnets 21 for focusing motion have the same magnetic flux density, this causing a pitching due to leakage flux.

SUMMARY OF THE INVENTION

Accordingly, the present invention is directed to a slim type optical pick-up actuator that substantially obviates one or more problems due to limitations and disadvantages of the related art.

An object of the present invention is to provide a slim type optical pick-up actuator having a lens holder capable of 3-axis motion using a magnetic circuit structure thereof.

Also, an object of the present invention is to provide a slim type optical pick-up actuator including: a focusing coils that have two wound coils connected in series, the focusing coils installed within the lens holder; a tracking coil and a tilt coil respectively installed on the front of and on the top of the focusing coils; a bipolar magnet facing the focusing coils; an unipolar magnet disposed in the focusing coils, thereby performing 3-axis motion.

Further, an object of the present invention is to provide a slim type optical pick-up actuator that is provided with the tilt coil in an air gap between the focusing coils and the bipolar magnet, the focusing coil being provided on the top with the tilt coil having one wound coil, thereby optimizing optical characteristics of the radial tilt.

Further, an object of the present invention is to provide a slim type optical pick-up actuator, in which magnets having different flux densities are disposed facing each other in order to maintain main flux to leakage flux ratio, such that a flux ratio of minimizing a pitching can be easily attained.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a slim type optical pick-up actuator including: a lens holder provided with an object lens mounted at a predetermined portion thereof, two or more focusing coils received in a receiving groove thereof, a tracking coil disposed on a front surface of the focusing coils, and a tilt coil disposed on a top of the focusing coils, and moving in 3-axis directions; a bipolar magnet disposed facing the coils; two or more unipolar magnets facing the bipolar magnet and having an opposite polarity to the bipolar magnet; a yoke plate having a bent inner yoke, the inner yoke having inner surfaces facing each other, on which the bipolar magnet and the two or more unipolar magnets are respectively attached; and a wire suspension supporting moving of the lens holder and electrically connected to the coils.

In another aspect of the present invention, a slim type optical pick-up actuator including: a lens holder provided with an object lens mounted at a predetermined portion thereof, two or more focusing coils received in a receiving groove thereof, a tracking coil disposed on a front surface of the focusing coils, and a tilt coil disposed on a top of the focusing coils; a yoke plate having a first inner yoke and two or more second inner yokes, the first inner yoke and the second inner yokes being protruded to face each other; a bipolar magnet attached on an inner surface of the first inner yoke; two or more unipolar magnets attached on inner surfaces of the second inner yokes; three pairs of wire suspensions supporting both sides of the lens holder so as to supply a current to the coils; a frame supporting the three pairs of wire suspension and fixed to a rear surface of the yoke plate; and a main board attached on a backside of the frame, for supplying a power to the coils.

In a further another aspect of the present invention, a slim type optical pick-up actuator including: a lens holder provided with an object lens mounted at a predetermined portion thereof, two or more focusing coils received in a receiving groove thereof, a tracking coil disposed on a front surface of the focusing coils, and a tilt coil disposed on a top of the focusing coils, and moving in 3-axis directions; a yoke plate having a first inner yoke, two or more second inner yokes, and an upper yoke designed to cover a portion between the first inner yoke and the second inner yokes, the first inner yoke and the second inner yokes being protruded to face each other; a bipolar magnet attached on an inner surface of the first inner yoke; two or more unipolar magnets attached on inner surfaces of the second inner yokes; and a wire suspension supporting moving of the lens holder and electrically connected to the coils.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
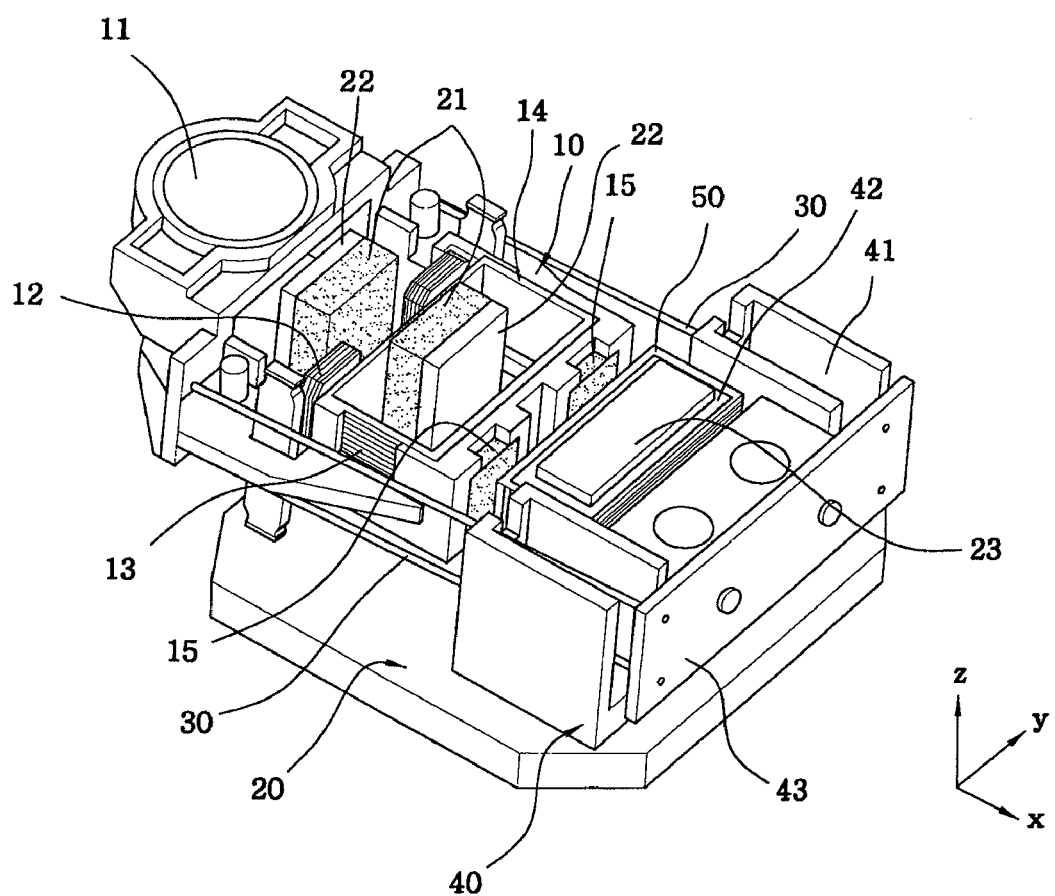
FIG. 1 is a perspective view of a 3-axis motion type optical pick-up actuator according to the related art.
Figure 2:
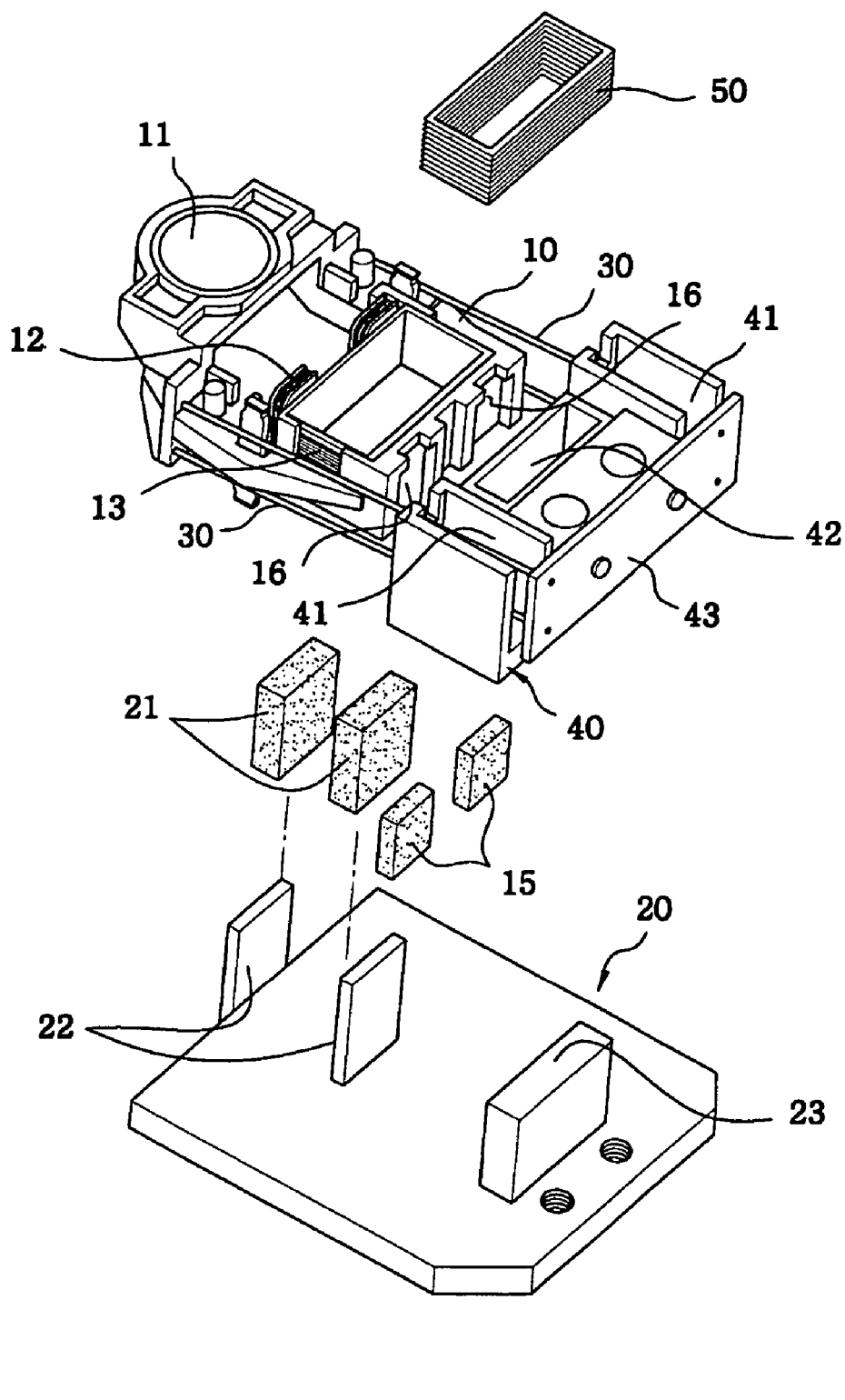
FIG. 2 is an exploded perspective view of a 3-axis motion type optical pick-up actuator according to the related art.
Figure 3:
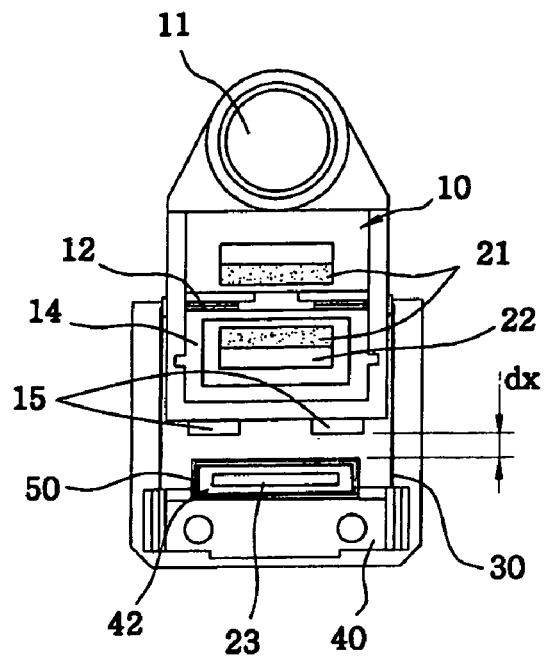
FIG. 3 is a plane view illustrating an affection of the tracking motion on a tilt motion in a 3-axis motion type optical pick-up actuator according to the related art.
Figure 4:
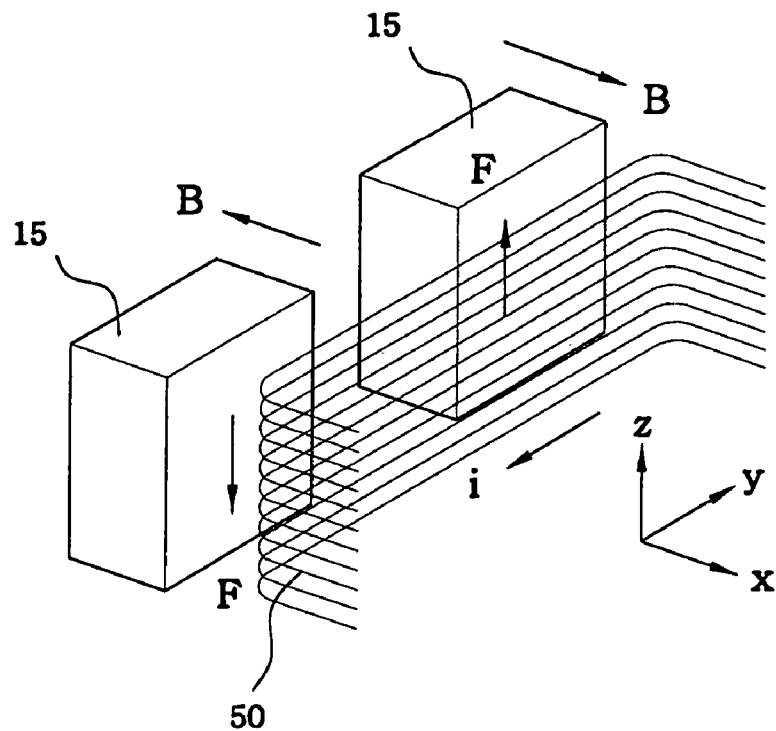
FIG. 4 is a perspective view illustrating a tilt motion performed by tilt magnets and a tilt coil depicted in FIGS. 1 through 3.
Figure 5:
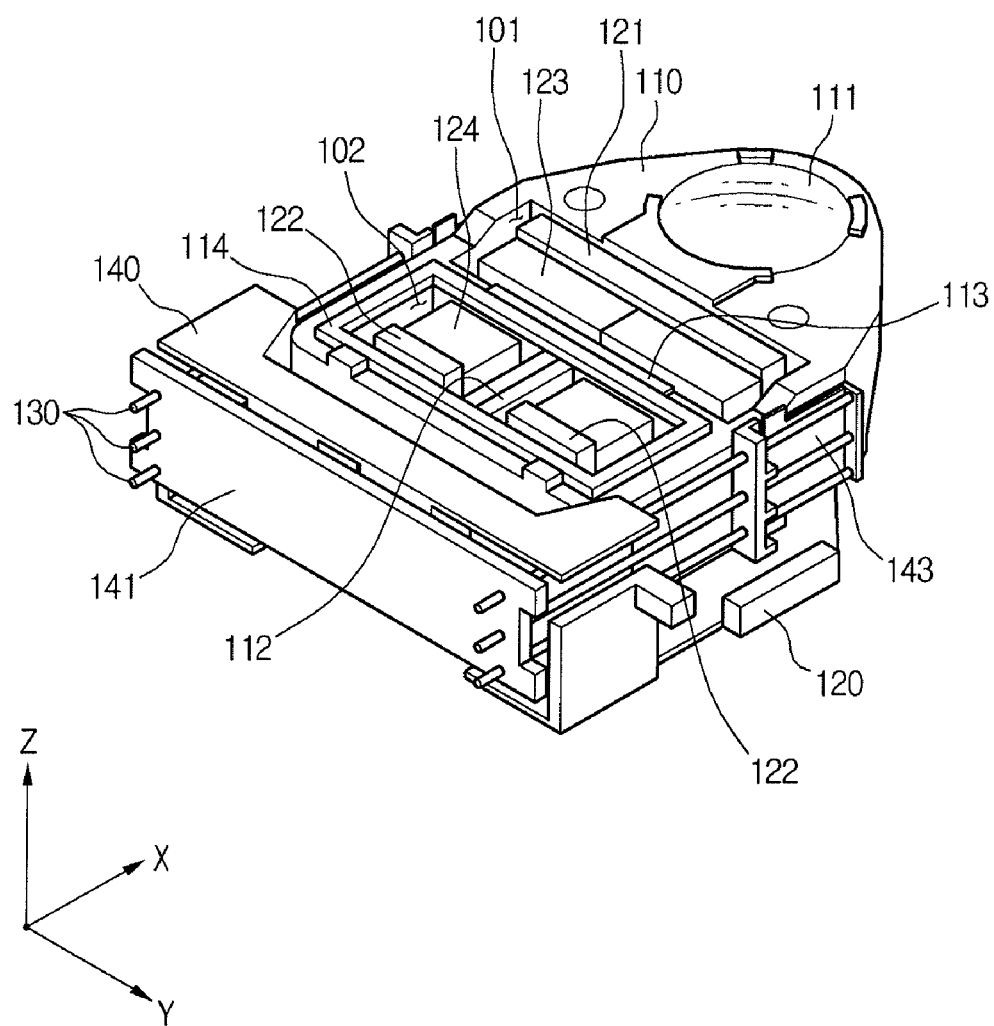
FIG. 5 is a perspective view of a slim type optical pick-up actuator according to one preferred embodiment of the present invention.
Figure 6:
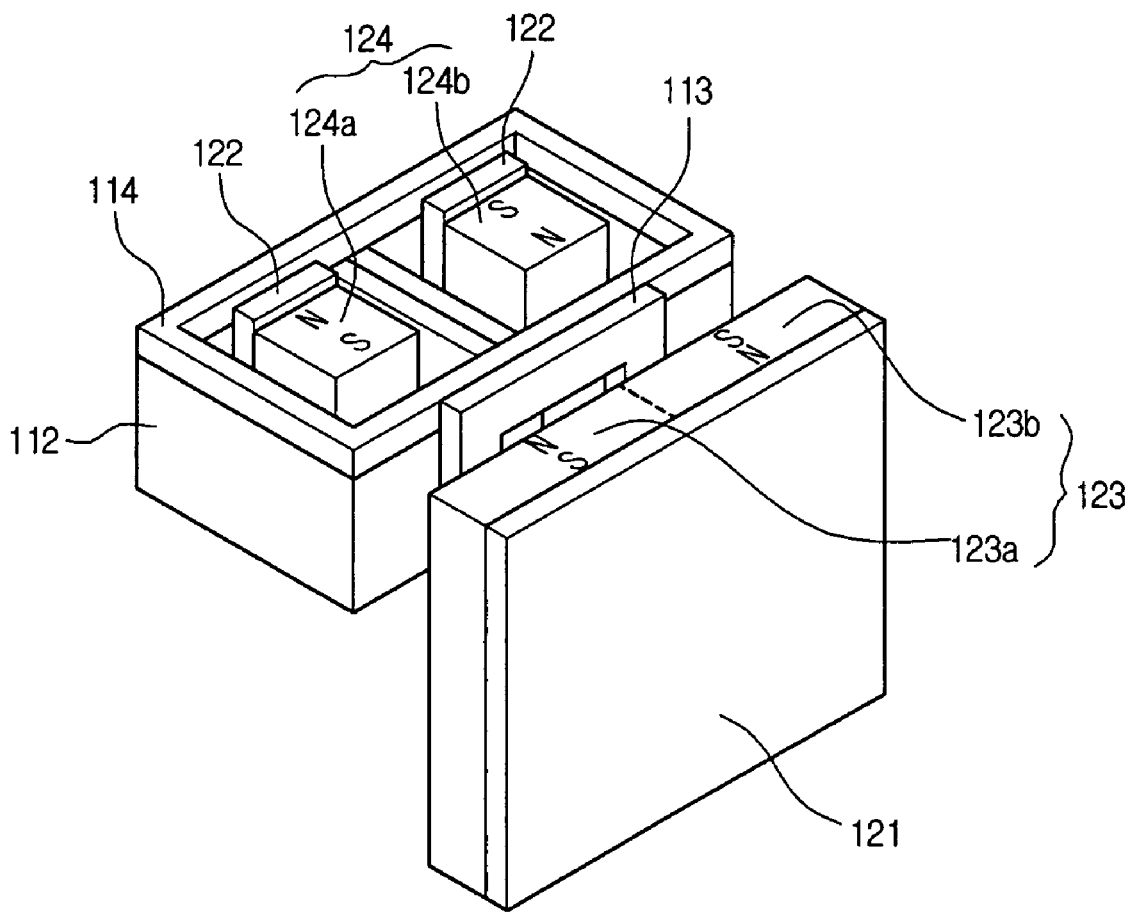
FIG. 6 is a view illustrating an arrangement of coils, magnets, and yokes of the optical pick-up actuator depicted in FIG. 5.
Figure 7:
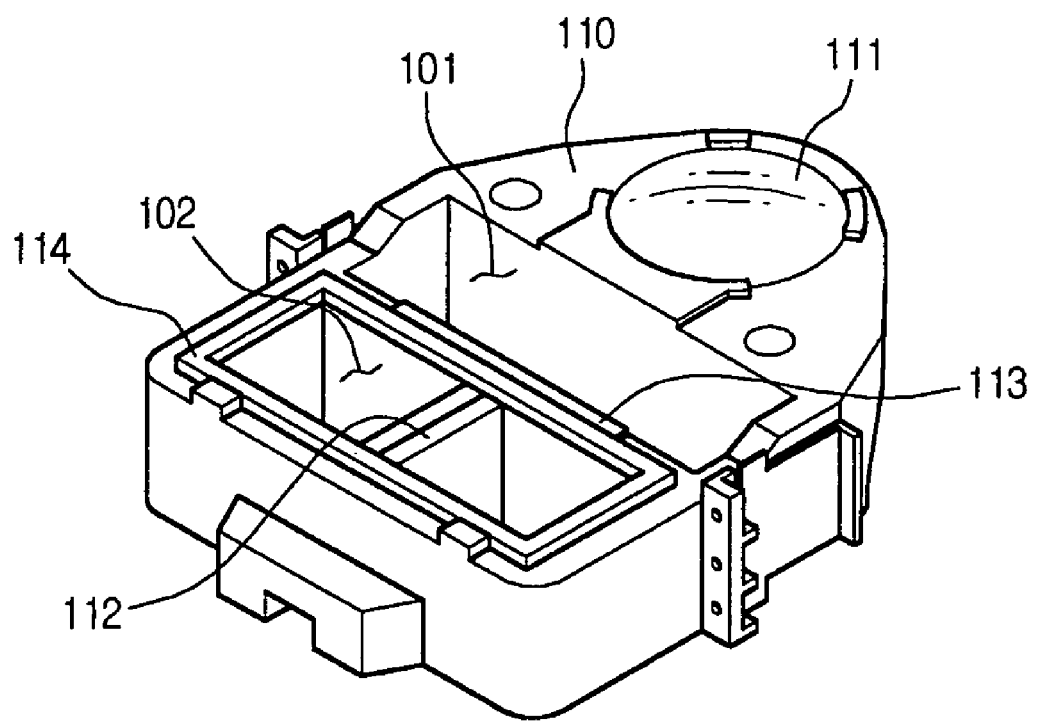
FIG. 7 is a perspective view of a lens holder of an optical pick-up actuator depicted in FIG. 5.

FIG. 5 is a perspective view of a slim type optical pick-up actuator, which enables a multiaxial driving according to one preferred embodiment. FIG. 6 is a view illustrating an arrangement of coils, magnets, and yokes of the optical pick-up actuator in FIG. 5. FIG. 7 is a view of coils installed in a lens holder.

Referring to FIGS. 5 through 7, the slim type optical pick-up actuator of the present invention includes: a lens holder 110 for holding an object lens 111, the lens holder 110 having two or more focusing coils 112, a tracking coil 113 disposed on a front surface of the focusing coils 112, and a tilt coil 114 disposed on a top of the focusing coils 112; a yoke plate 120 formed with a first inner yoke 121 and two or more second inner yokes 122, the first inner yoke 121 and the second inner yokes 122 being protrusively formed in a first and a second receiving groove 101 and 102 of the lens holder 110 to face each other; a first magnet 123 (hereinafter bipolar magnet) and two or more second magnets 124 (hereinafter unipolar magnets) that are respectively attached on the first inner yoke 121 and the second inner yokes 122; three pairs of wire suspensions 130 supporting both sides of the lens holders 110 to feed current to the coils 112, 113, and 114; a frame 140 fixed on a rear portion of the yoke plate 120 to support the wire suspensions 130; and a main board 141 attached on a rear surface of the frame 140 to supply electric power to the coils 112, 113, and 114.

The focusing coils 112 are comprised of two coils that are horizontally wound and connected to each other in series, the two coils inserted respectively into the right and left portions of the second receiving groove 102 with respect to a polarity boundary of the bipolar magnet 123. The unipolar magnet 124 and the second inner yokes 122 are disposed in the respective wound coils of the focusing coils 112.

The tracking coil 113 is attached on the front surface of the focusing coils 112 having a central line corresponding to the polarity boundary of the bipolar magnet 123. The tilt coil 114 is disposed on a top of the focusing coils 112, opposing the bipolar magnet 123.

The bipolar magnet 123 may be formed of one magnet having multi poles on one face or two magnets having a pair of opposite poles on each face. The bipolar magnet 123 is disposed such that the poles thereof are opposite to those of the unipolar magnets 124.

Referring to FIG. 5, the object lens 11 is mounted on a portion of a top of the lens holder 110, and the coils 112, 113 and 114 are installed inside the lens holder 110.

The bipolar magnet 123 is fixed on a surface of the first inner yoke 121 to oppose the coils 112, 113 and 114. The unipolar magnets 124 are attached on the second inner yokes 122 to oppose the bipolar magnet 123.

Referring to FIG. 6, there are the focusing coils 112 having two wound coils connected in series, the tracking coil attached on the front surface of the focusing coils 112 to correspond to the polarity boundary of the focusing coils 112, and the tilt coil 114 attached on the top of the focusing coils 112. The coils 112, 113 and 114 cooperate with the magnets 123 and 124 to define a magnetic circuit for a multi-axis driving.

That is, as shown in FIG. 7, the lens holder 110 is provided with the first and the second receiving grooves 101 and 102 for receiving the magnetic circuit. The focusing coils 112 connected in series are disposed on an inner circumference of the second receiving groove 102 in the left and right sides, which is divided on the basis of the polarity boundary of the bipolar magnet 123, such that a center of the lens holder 110 can correspond to a center of focusing force.

As the tilt coil 114 is installed on the top of the focusing coils 112, flux at a boundary between the focusing coils 112 may be minimized while sensitivity is maximized.

The tracking coil 113 that is vertically wound is attached on the front surface of the focusing coils 112 and fixed between the first and the second receiving groove 101 and 102, opposing the polarity boundary of the bipolar magnet 123. Herein, the front surface of the focusing coils means a surface heading for the object lens 111.

The tilt coil 114 is formed of a single body attached on the focusing coils 112 such that a radial tilt center thereof can be adjacent to the object lens 111 as close as possible, thereby improving the productivity without limiting a focusing motion.

In addition, when the lens is driven in a radial tilt direction, an offset between the force center of the tilt coil 114 and a Z-axis optical center for tilting the object lens can be minimized, thereby optimizing the optical property of the radial tilt.

Referring again to FIG. 5, the yoke plate 120 is formed with the first inner yoke 121 and the two or more second inner yokes 122 which protrude therefrom. The first inner yoke 121 extends to the first receiving groove 101. The two or more second inner yokes 122 extend to the second receiving groove 102, opposing the focusing coils 112 that are disposed in the second receiving groove 102.

The bipolar magnet 123 is attached inwardly on the first inner yoke 121 and the unipolar magnets 124 inwardly on the second inner yokes 122 with their poles heading for opposite poles of the bipolar magnet 123, thereby minimizing leakage flux.

In other words, by the arrangement that the poles of the bipolar magnet 123 and the poles of the unipolar magnets 124 are facing each other with opposite polarity, a flux therefrom efficiently reacting with a flux resulting from coils.

The bipolar magnet 123 may be formed of a pair of unipolar magnets or one magnet having multi poles on one face. If the former, there may be a small air gap between the unipolar magnets.

The bipolar magnet 123 and the unipolar magnets 124 may have different thicknesses to have different magnetic flux densities, such that the leakage flux therefrom can be used for optimizing an additional resonance resulting from the difference between centers of focusing force and tracking force.

For example, if the pick-up actuator is required to have a main flux to leakage flux ratio of 10:1 for minimizing a pitching action, the flux densities of magnets are adjusted to satisfy that ratio.

That is, magnetic flux densities of bipolar magnet 123 and the unipolar magnets 124 is adjusted to have a difference value of 10%, for example, when the magnetic flux density of the bipolar magnet 123 is 100, the magnetic flux density of the unipolar magnets 124 is 90. The reverse case is also possible.

The wire suspensions 130 having a plurality of wires are connected between each side of the lens holder 110 and the frame 140 for holding the lens holder 110 tightly and flexibly. As an embodiment, the wire suspensions 130 holding the lens holder 110 may be formed of two pairs of wires, three pairs of wires or so on.

The main board 141 attached on a rear surface of the frame 140 and boards (or contact boards) 143 assembled on each side of the lens holder 110 are electrically connected by the wire suspensions, thereby supplying power to the coils 112, 113, and 114.

Wire holders are provided on each side of the lens holder 110 for holding the wire suspensions to be connected to the boards 143.

Figure 9:
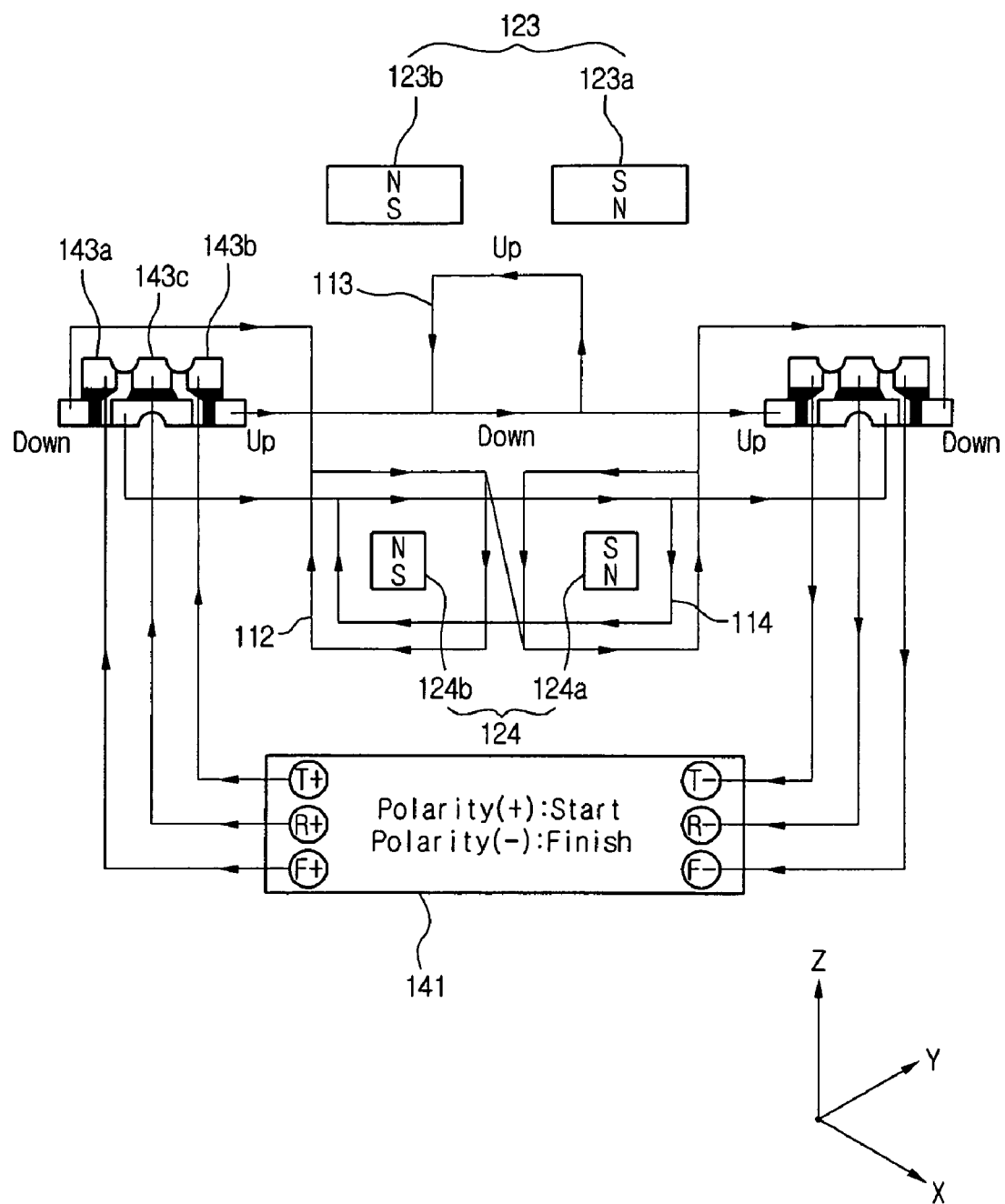
FIG. 9 is a magnetic circuit diagram of an optical pick-up actuator according to preferred embodiments of the present invention.

FIG. 9 is a magnetic circuit diagram of the optical pick-up actuator according to one preferred embodiment of the present invention.

Referring to FIG. 9, each of the boards 143 having a T-shape is formed with contact portions 143a, 143b, and 143c to connect the wire suspensions and the coils 112, 113 and 114 for supplying power to the coils 112, 113, and 114. Each wire of the wire suspensions can be fabricated with same size and length for productivity.

Each of the focusing, the tracking, and the tilt coils 112, 113, and 114 can be bonded tightly before each of them is disposed in the receiving grooves 101 and 102.

Further, weight of the lens holder 110 can be reduced with elimination of bobbins fixing the coils 112, 113, and 114.

Furthermore, completely wound coils are disposed in the receiving grooves 101 and 102 and then can be fixed to the lens holder 110 with epoxy resins or the like.

Figure 8:
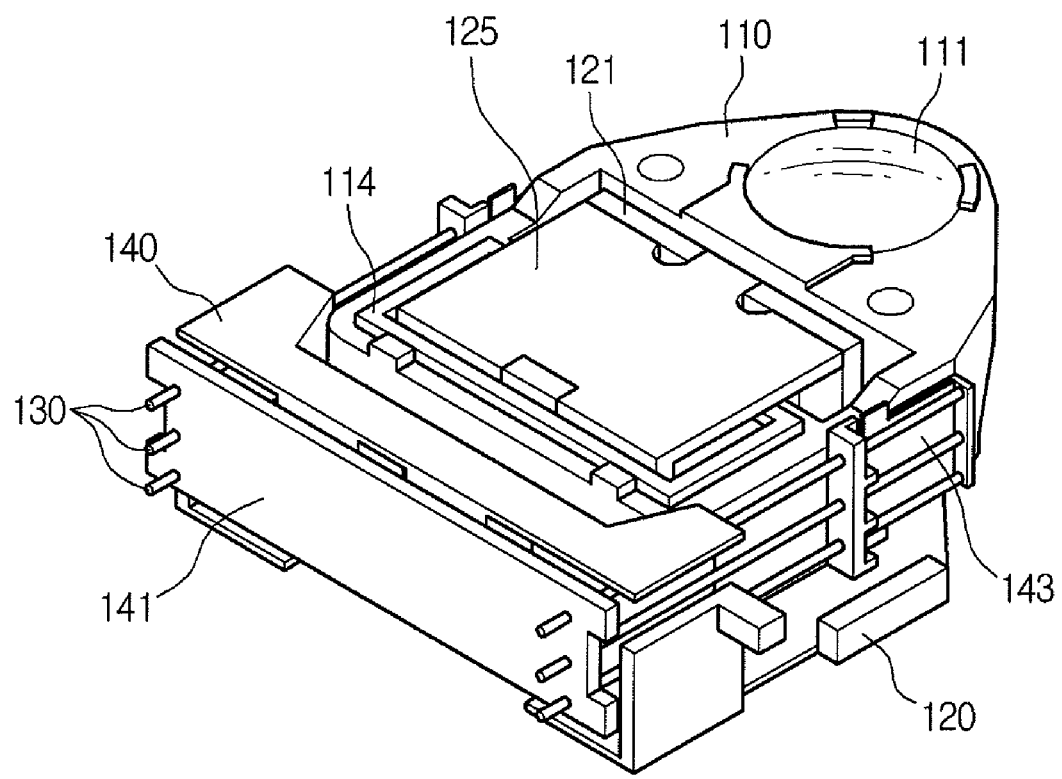
FIG. 8 is a perspective view of a slim type optical pick-up actuator according to another preferred embodiment of the present invention.

FIG. 8 a perspective view of the slim optical pick-up actuator according to another preferred embodiment of the present invention. Another embodiment shown in FIG. 8 includes an upper yoke 125 over the first inner yoke 121 and the second inner yokes 122 for forming closed magnetic circuit therethough.

A multi-axis driving of the optical pick-up actuator of the present invention will now be described.

Figure 10A:
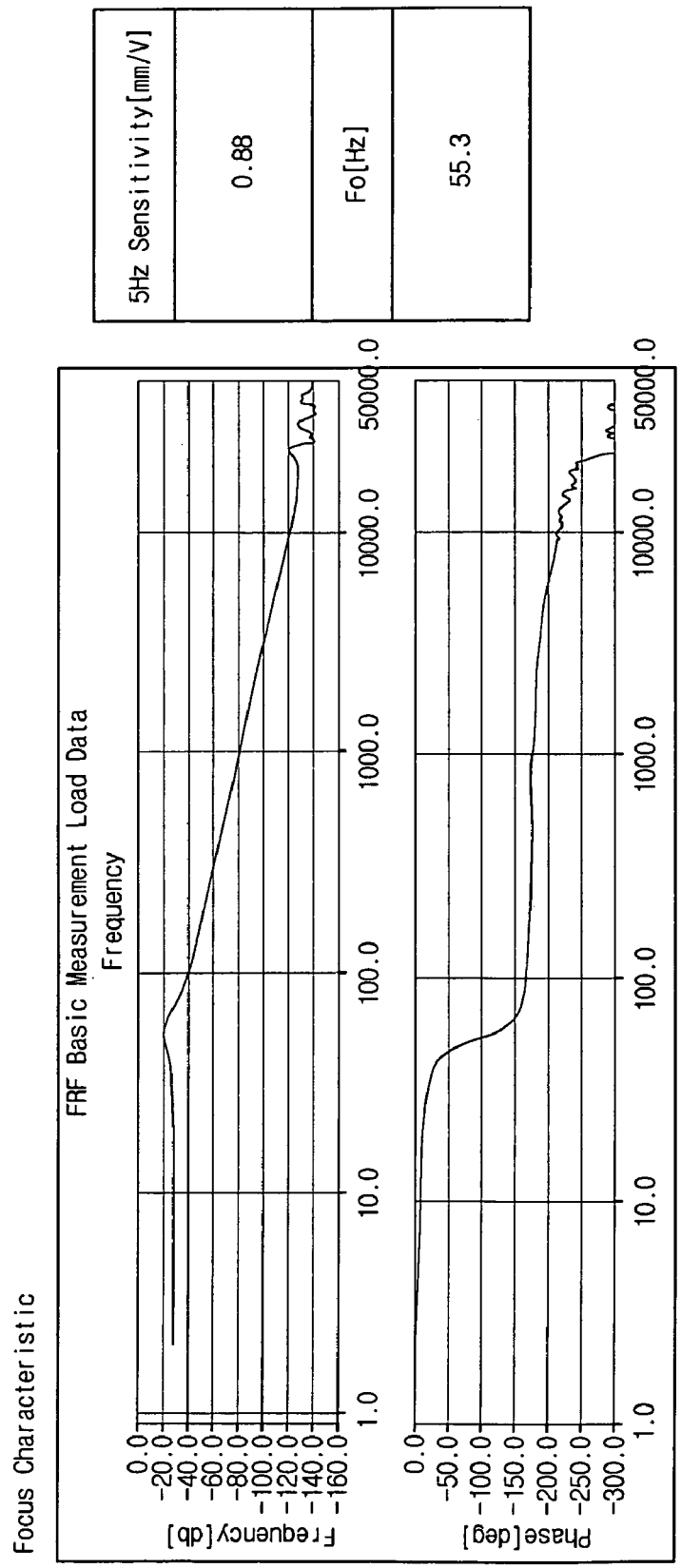
FIGS. 10*a*, 10*b*, and 10*c* are frequency-phase graphs respectively illustrating characteristics of a focusing, a tracking, and a radial tilt motions of an optical pick-up actuator according to the present invention.
Figure 10B:
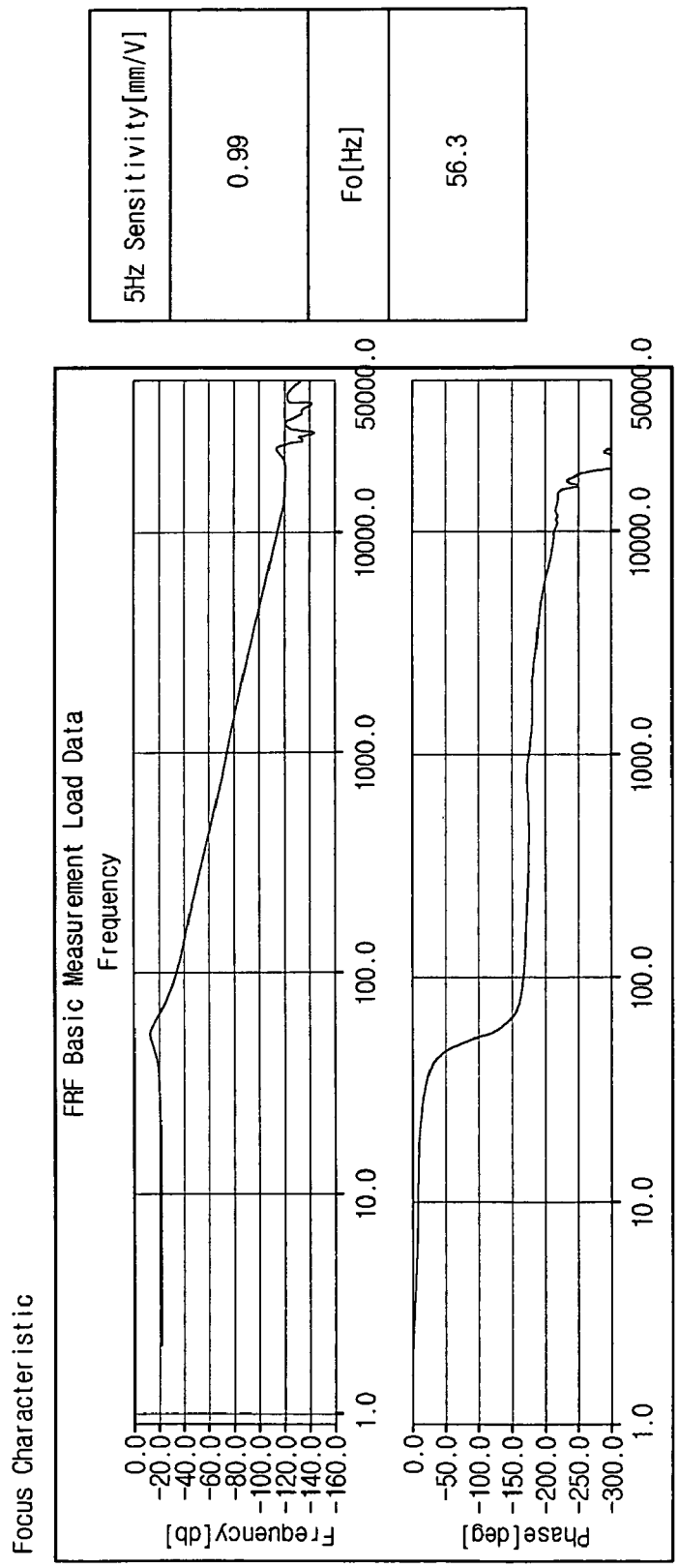
Figure 10C:
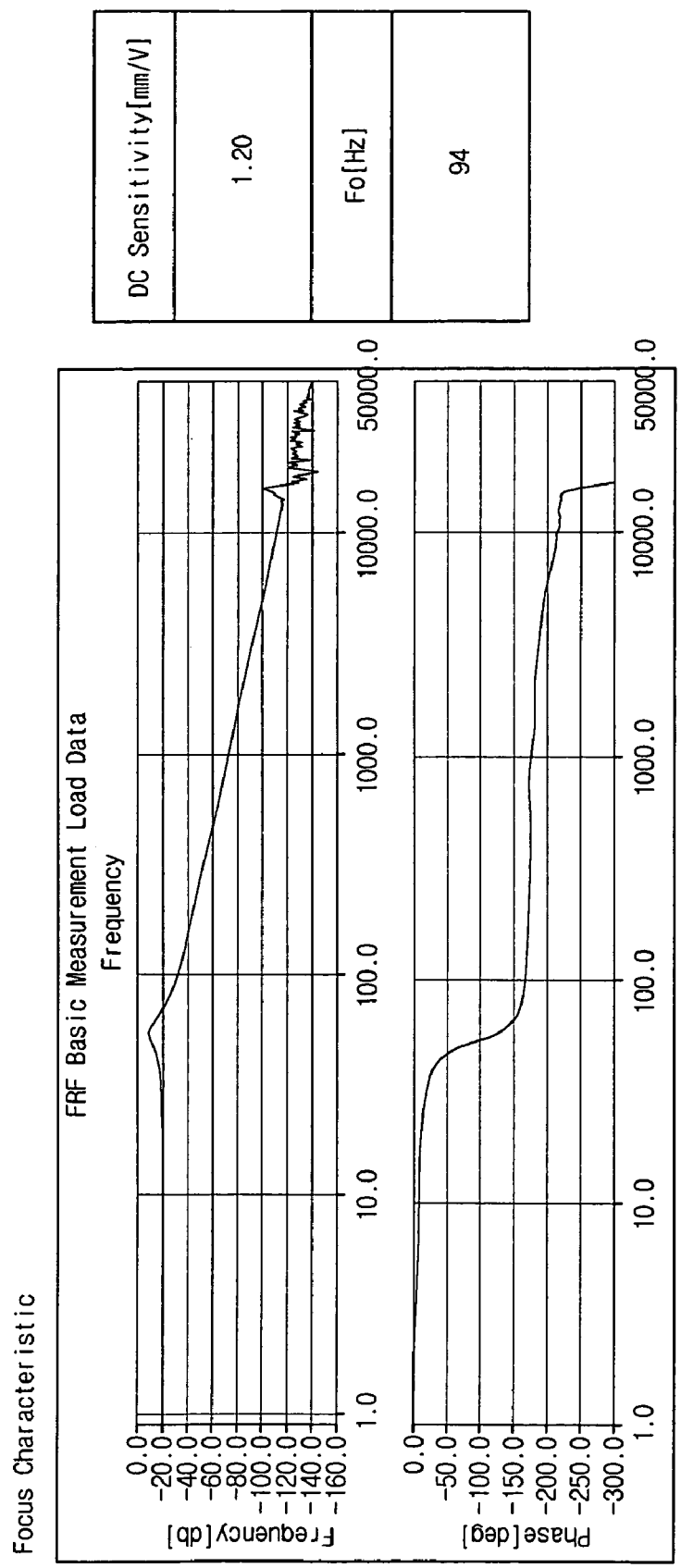

FIGS. 10a, 10b, and 10c are frequency-phase graphs illustrating characteristics of a focusing, a tracking and a radial tilt motions according to the present invention.

The focusing motion is performed as followings.

When currents (F+, F−) are applied to the a pair of focusing coils 112 which are connected to each other in series, an electromagnetic force is generated between the focusing coils 112 and the bipolar magnet 123.

Magnetic flux of the focusing coils 112 highly intersect magnetic flux of the magnets 123 and 124 around a portion of the focusing coils disposed between the opposite poles of the bipolar magnet 123 and the unipolar magnet 124, while a center of the two focusing coils having minimal interesting fluxes.

The focusing coils 112 move upward or downward according to an electromagnetic force generated by the intersecting fluxes. The motion characteristic of the focusing coil 112 is shown in the graph of FIG. 10a illustrating relationship between phase and frequency. At this time, 5 Hz sensitivity is 0.88 mm/V and resonance frequency $F_0$ is 55.3.

The tracking motion is performed as followings.

When currents (T+, T−) are applied to the tracking coil 113, an electromagnetic force is generated between the tracking coil 113 and the bipolar magnet 123.

Left portion of the tracking coil 113 is disposed between S pole of the bipolar magnet 123 and N pole of the unipolar magnets 124 and right portion thereof is disposed between N pole of the bipolar magnet 123 and S pole of the unipolar magnets 124 such that the lens holder 110 and the tracking coil 113 move left of right by the electromagnetic force generated. The motion characteristic of the tracking coil 113 is shown in the graph of FIG. 10b illustrating relationship between phase and frequency. At this time, 5 Hz sensitivity is 0.99 mm/V and resonance frequency $F_0$ is 56.3.

The radial tilt motion is performed as followings.

When currents (R+, R−) are applied to the tilt coil 114, an electromagnetic force is generated between the tilt coil 114 and the bipolar magnet 123.

Because left and right sides of the tilt coil 114 are interposed respectively between the opposite poles of the bipolar magnet 123 and the unipolar magnet 124, the left and right sides have maximal electromagnetic force and a center line of the tilt coil 114 have minimal electromagnetic force.

Accordingly, the lens holder 110 and the tilt coil 114 move in a direction of tilt by the electromagnetic force generated. The motion characteristic of the tilt coil 114 is shown in the graph of FIG. 10c illustrating relationship between phase and frequency. At this time, DC sensitivity is 1.20 deg/V and resonance frequency $F_0$ is 94.

As described above, by electromagnetic interactions between the coils 112, 113, and 114 and the magnets 123 and 124, the coils and the lens holder 110 are forced to move. Further, the direction of motion of the lens holder 110 varies according to the direction of the current. Herein, the motion of the coils follows Fleming's left hand rule.

A 3-axis driving of the slim optical pick-up actuator of the present invention is accomplished by arranging the two focusing coils 112 connected in series and the bipolar magnet 123 to be faced with each other, installing the tilt coil 113 on the top of the focusing coils 112 and the tracking coil 113 on the front of the focusing coils 112, and using one piece of the bipolar magnet 123, two unipolar magnets 124 and inner yokes.

The slim optical pick-up actuator doesn't use magnets that are used for tilt motion in the related art with no added part like shafts. Further, it uses the wire suspension having a symmetric and same size wires instead of wire suspensions using separate stranded wires, thereby improving productivity and obtaining cost reduction.

As described above, the slim type optical pick-up actuator of the present invention performs 3-axis driving by installing the focusing coils within the lens holder, the tracking coil and the tilt coil respectively on the front of and on the top of the focusing coils 112, arranging the coils and the bipolar magnet to be faced with each other, the bipolar magnet and the unipolar magnets to be faced with each other.

The bipolar magnet and two pieces of the unipolar magnets are arranged to face each other with opposite poles such that the magnetic flux of magnets is maximized and thus the magnetic flux of the coils can efficiently interact with the magnetic flux of magnets.

The polarity boundary of the two unipolar magnets correspond to the central line of the focusing coils such that sensitivity can be maximized with minimal flux.

The one tilt coil is disposed on the top of the focusing coils such that productivity is improved without limiting the focusing motion.

When the lens is driven in a radial tilt direction, an offset between the force center of the tilt coil and a Z-axis optical center for tilting the object lens can be minimized, thereby optimizing the optical property of the radial tilt.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A slim type optical pick-up actuator comprising:
a lens holder provided with an object lens mounted at a predetermined portion thereof, two or more focusing coils received in a receiving groove thereof, a tracking coil disposed on a front surface of the focusing coils, and a tilt coil, and moving in 3-axis directions;
a bipolar magnet disposed facing the coils;
two or more unipolar magnets facing the bipolar magnet and having an opposite polarity to the bipolar magnet;
a yoke plate configured to respectively attach the bipolar magnet and the two or more unipolar magnets; and
a wire suspension supporting moving of the lens holder and electrically connected to the coils,
wherein the lens holder is formed with a plurality of receiving grooves including a first receiving groove and a second receiving groove therein, the bipolar magnet and a first yoke of the yoke plate being disposed in the first receiving groove, the focusing coils and the tilt coil being installed in the second receiving groove, and the unipolar magnets and a second yoke of the yoke plate being disposed in the second receiving groove, the tracking coil being installed between the first receiving groove and the second receiving groove.

2. The slim type optical pick-up actuator according to claim 1, wherein the first yoke is an inner yoke.

3. The slim type optical pick-up actuator according to claim 1, wherein the two or more focusing coils are connected in series and face a polar boundary of the bipolar magnet,
the tracking coil is installed at the polar boundary of the bipolar magnet in front of a center of the two or more focusing coils, and
the tilt coil is solely installed on the two or more focusing coils and faces an opposite polarity of the bipolar magnet.

4. The slim type optical pick-up actuator according to claim 1, wherein the bipolar magnet faces the unipolar magnets, and the bipolar magnet and the unipolar magnets are arranged such that the polarity of the bipolar magnet is opposite to the polarity of the unipolar magnets.

5. The slim type optical pick-up actuator according to claim 1, wherein the bipolar magnet and the unipolar magnets are designed to have different thicknesses.

6. A slim type optical pick-up actuator comprising:
a lens holder provided with an object lens mounted at a predetermined portion thereof, two or more focusing coils received in a receiving groove thereof, a tracking coil disposed on a front surface of the focusing coils, and a tilt coil;
a yoke plate having a first yoke and two or more second yokes;
a bipolar magnet art ached on an inner surface of the first yoke;
two or more unipolar magnets attached on surfaces of the second yokes; and
three pairs of wire suspensions supporting both sides of the lens holder so as to supply a current to the coils,
wherein the tracking coil is vertically wound, of which a center faces a polar boundary of the bipolar magnet, is attached in a front direction of the focusing coils, and is inserted and fixed between a first receiving groove and a second receiving groove.

7. The slim type optical pick-up actuator according to claim 6, wherein the bipolar magnet is one magnet magnetized to have multi-poles on the same side, or two magnets magnetized to have a pair of opposite poles respectively, and the bipolar magnet and the unipolar magnets are arranged such that the polarity of the bipolar magnet is opposite to the polarity of the unipolar magnets.

8. The slim type optical pick-up actuator according to claim 7, wherein the bipolar magnet and the unipolar magnets are designed to have different thicknesses.

9. The slim type optical pick-up actuator according to claim 6, wherein the tilt coil is solely attached on the focusing coils such that a radial tilt center of the tilt coil is installed most adjacent to a center of the object lens.

10. A slim type optical pick-up actuator comprising:
a lens holder provided with an object lens mounted at a predetermined portion thereof, two or more focusing coils received in a receiving groove thereof, a tracking coil disposed on a front surface of the focusing coils, and a tilt coil, and moving in 3-axis directions;
a yoke plate having a first yoke, two or more second yokes, and an upper yoke designed to cover a portion between the first yoke and the second yokes, the first yoke and the second yokes being faced to each other;
a bipolar magnet attached on a surface of the first yoke;
two or more unipolar magnets attached on surfaces of the second yokes; and
a wire suspension supporting moving of the lens holder and electrically connected to the coils,
wherein the lens holder is formed with a plurality of receiving grooves including a first receiving groove and a second receiving groove therein, the bipolar magnet and a first yoke of the yoke plate being disposed in the first receiving groove, the focusing coils and the tilt coil being installed in the second receiving groove, and the unipolar magnets and a second yoke of the yoke plate being disposed in the second receiving groove, the tracking coil being installed between the first receiving groove and the second receiving groove.

11. The slim type optical pick-up actuator according to claim 10, wherein the first yoke is an inner yoke and the second yoke is an inner yoke.

12. The slim type optical pick-up actuator according to claim 10, wherein the two or more focusing coils are connected in series and face a polar boundary of the bipolar magnet,
the tracking coil is installed at the polar boundary of the bipolar magnet in front of a center of the two or more focusing coils, and
the tilt coil is solely installed on the two or more focusing coils and faces an opposite polarity of the bipolar magnet.

13. The slim type optical pick-up actuator according to claim 10, wherein the bipolar magnet faces the unipolar magnets, and the bipolar magnet and the unipolar magnets are arranged such that the polarity of the bipolar magnet is opposite to the polarity of the unipolar magnets.

14. The slim type optical pick-up actuator according to claim 10, wherein the bipolar magnet and the unipolar magnets are designed to have different thicknesses.

15. A slim type optical pick-up actuator comprising:
a lens holder provided with an object lens mounted at a predetermined portion thereof, a focusing coil disposed at a predetermined portion thereof, a tracking coil disposed on a front surface of the focusing coil, and a tilt coil disposed on a top of the focusing coil, and moving in 3-axis directions;
a first magnet disposed facing the coils;

a second magnet facing the first magnet and having an opposite polarity to the first magnet;

a yoke plate having an inner yoke, the inner yoke having inner surfaces facing each other, on which the first magnet and the second magnet are respectively attached; and a wire suspension supporting moving of the lens holder and electrically connected to the coils, wherein the lens holder is formed with a plurality of receiving grooves including a first receiving groove and a second receiving groove therein, the first magnet and a first inner yoke of the yoke plate being disposed in the first receiving groove, the focusing coil and the tilt coil being installed in the second receiving groove, and the second magnet and a second yoke of the yoke plate being disposed in the second receiving groove, the tracking coil being installed between the first receiving groove and the second receiving groove.

16. The slim type optical pick-up actuator according to claim 15, wherein the focusing coil having two coils which are connected in series and face a polar boundary of the first magnet, the tracking coil is installed at the polar boundary of the first magnet in front of a center of the two focusing coil, and the tilt coil is solely installed on the two focusing coils and faces an opposite polarity of the first magnet.

17. The slim type optical pick-up actuator according to claim 15, wherein the first magnet is bipolar magnet and the second magnet is unipolar magnet.

18. The slim type optical pick-up actuator according to claim 17, wherein the first magnet faces the second magnet, and the first magnet and the second magnet are arranged such that the polarity of the first magnet is opposite to the polarity of the second magnet.

19. The slim type optical pick-up actuator according to claim 15, wherein the inner yoke comprises the first inner yoke, a second inner yoke, and an upper yoke designed to cover a portion between the first inner yoke and the second inner yoke, and the first inner yoke and the second inner yoke face each other.

20. A slim type optical pick-up actuator comprising:

a lens holder provided with an object lens mounted at a predetermined portion thereof, one or more focusing coils, and a tracking coil;

first and second magnets facing each other with placing the coils therebetween, the first and second magnets having different magnetic flux densities; and a wire suspension supporting motions of the lens holder and electrically connected to the coils, wherein the lens holder is formed with a plurality of receiving grooves including the first receiving groove and the second receiving groove therein, the first magnet and a first yoke of a yoke plate being disposed in the first receiving groove, the focusing coil and a tilt coil being installed in the second receiving groove, and the second magnet and a second yoke of the yoke plate being disposed in the second receiving groove, the tracking coil being installed between the first receiving groove and the second receiving groove.

21. The slim type optical pick-up actuator according to claim 20, the lens holder further includes the tilt coil disposed on a top of the focusing coil.

22. The slim type optical pick-up actuator according to claim 20, wherein the first yoke is an inner yoke and the second yoke is an inner yoke.

23. The slim type optical pick-up actuator according to claim 22, wherein the inner yoke comprises the first inner yoke, the second inner yoke, and an upper yoke designed to cover a portion between the first inner yoke and the second inner yoke, and the first inner yoke and the second inner yoke face each other.

24. The slim type optical pick-up actuator according to claim 20, wherein the focusing coils are connected in series and face a polar boundary of the first magnet, the tracking coil is installed at the polar boundary of the first magnet in front of a center of the focusing coils, and the tilt coil is solely installed on the focusing coils and faces an opposite polarity of the first magnet.

25. The slim type optical pick-up actuator according to claim 20, the first magnet is a bipolar magnet, and the second magnet is a plurality of unipolar magnets.

26. The slim type optical pick-up actuator according to claim 20, wherein the first magnet and the second magnet are designed to have different thicknesses.

* * * * *